(12) United States Patent
Rock et al.

(10) Patent No.: US 7,318,973 B2
(45) Date of Patent: Jan. 15, 2008

(54) STAMPED BRIDGES AND PLATES FOR REACTANT DELIVERY FOR A FUEL CELL

(75) Inventors: Jeffrey A Rock, Fairport, NY (US); Scott C Ofslager, Albion, NY (US)

(73) Assignee: General Motors Corporation, Detroit, MI (US)

( * ) Notice: Subject to any disclaimer, the term of this patent is extended or adjusted under 35 U.S.C. 154(b) by 212 days.

(21) Appl. No.: 10/917,066

(22) Filed: Aug. 12, 2004

(65) Prior Publication Data

US 2006/0035133 A1 Feb. 16, 2006

(51) Int. Cl.
*H01M 2/14* (2006.01)
(52) U.S. Cl. .............................. 429/35; 429/34; 429/38; 429/39
(58) Field of Classification Search .................. 429/35
See application file for complete search history.

(56) References Cited

U.S. PATENT DOCUMENTS 5,514,487 A * 5/1996 Washington et al. .......... 429/39
6,017,648 A 1/2000 Jones
6,840,969 B2 1/2005 Kobayashi et al.
2002/0117780 A1* 8/2002 Inoue et al. ................. 264/299
2003/0049514 A1 3/2003 Mallant
2003/0087140 A1* 5/2003 Kikuchi et al. ............... 429/26
2003/0134173 A1 7/2003 Hatoh et al.

* cited by examiner

*Primary Examiner*—Jonathan Crepeau
*Assistant Examiner*—Tony Chuo

(57) ABSTRACT

The present invention discloses a stamped bridge member that defines a flow path between a header and a flow field on a fuel cell plate. The bridge member provides a support surface on which a seal can be positioned to seal the plate against adjacent plates or MEAs. The fuel cell plates can be stamped plates with two surfaces each having flow fields thereon. The flow fields maintain a fluid flowing between a supply header and a return header on a single surface of the plate. The ends of the flow fields can taper relative to the supply and return apertures to provide for a desired flow distribution through the flow field.

37 Claims, 9 Drawing Sheets

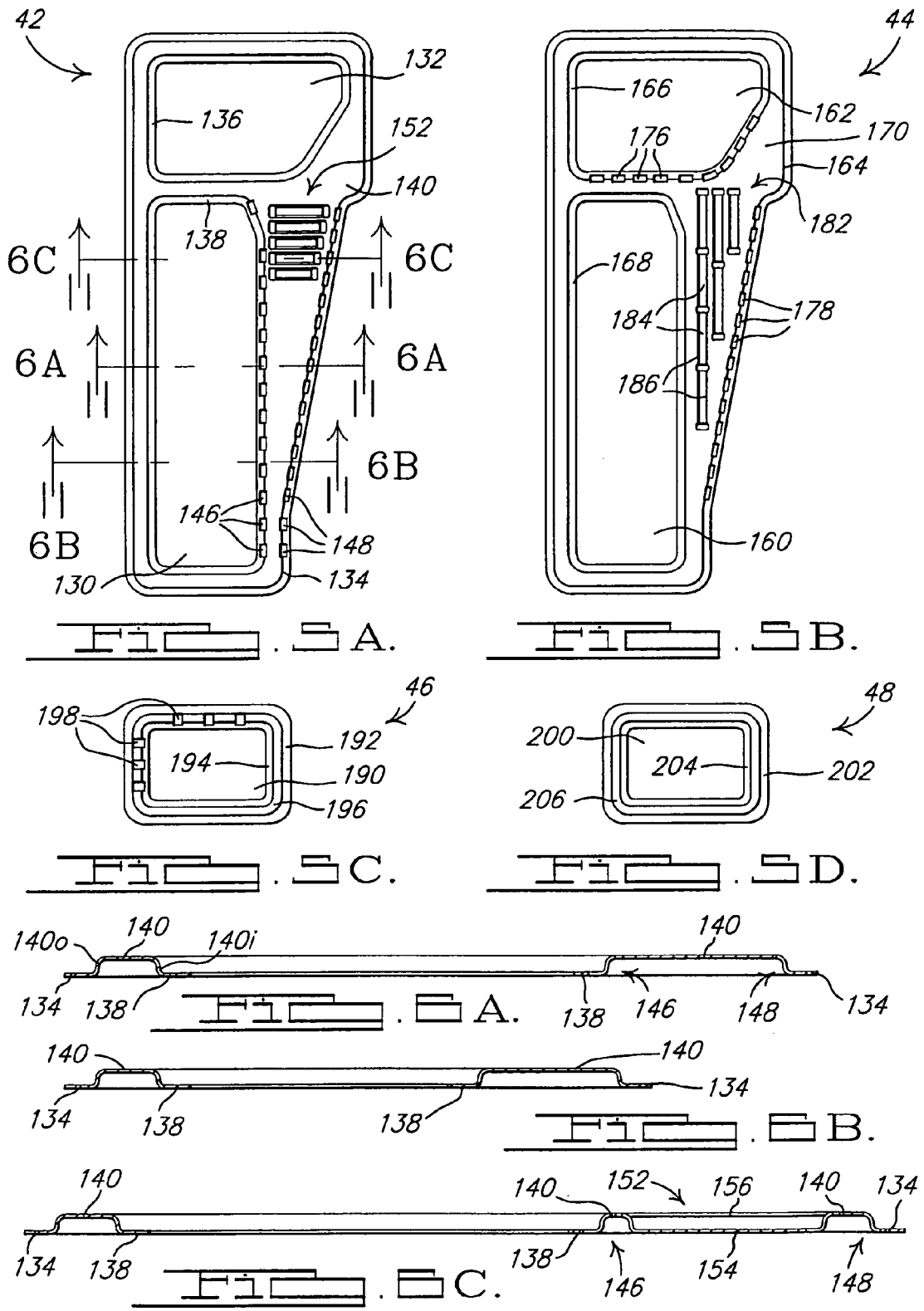

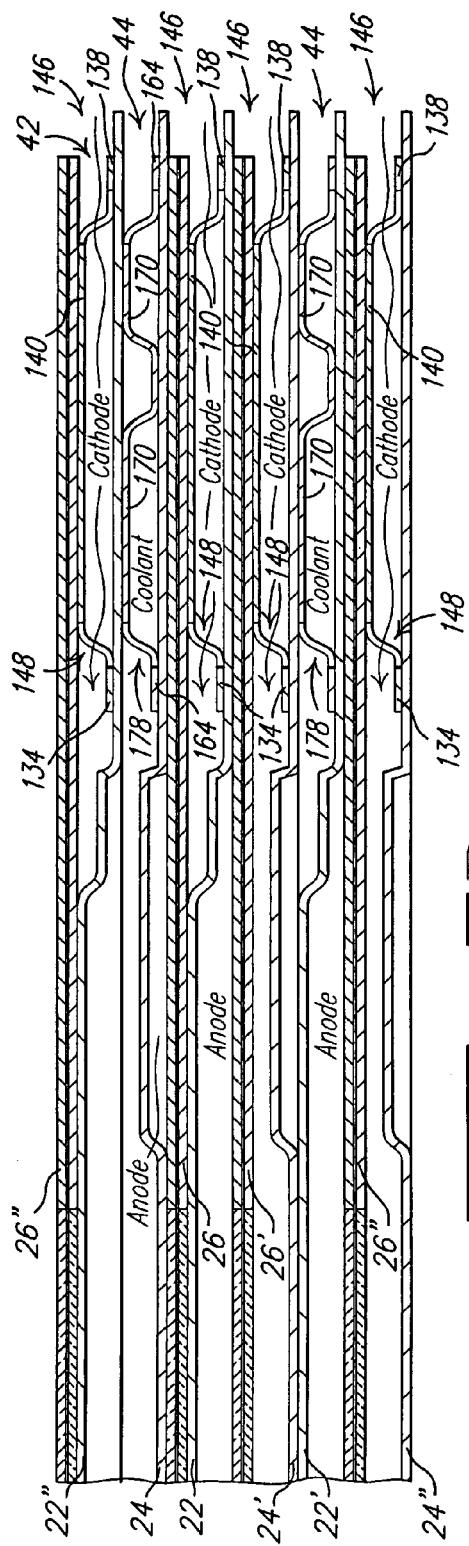
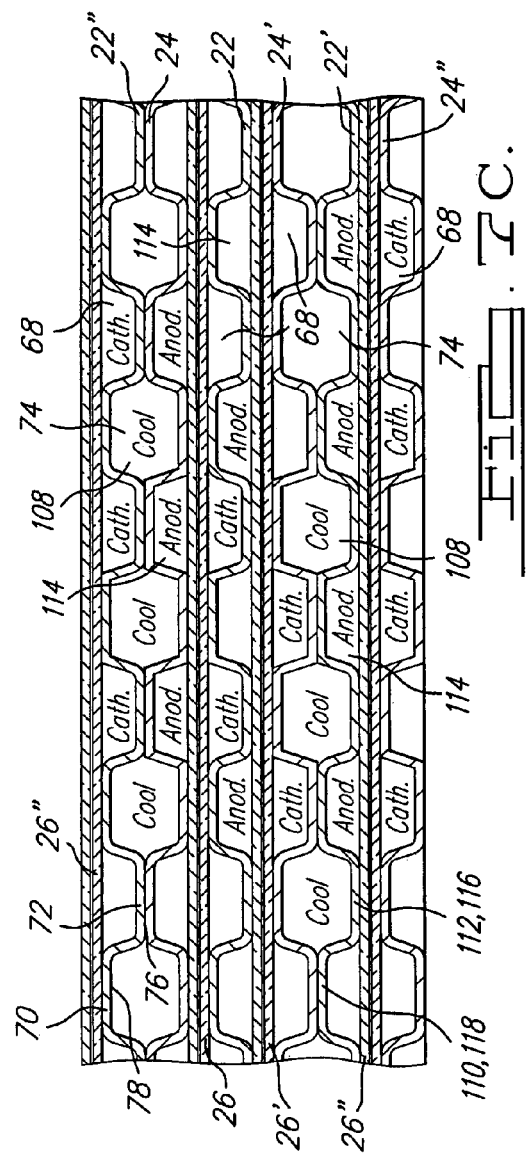

STAMPED BRIDGES AND PLATES FOR REACTANT DELIVERY FOR A FUEL CELL

FIELD OF THE INVENTION

The present invention relates to fuel cells and more particularly to stamped plates with flow fields thereon and stamped bridges that provide a sealing support surface and a flow path for reactant delivery between a header and a flow field on the plate of a fuel cell.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. As such these MEAs are relatively expensive to manufacture and require certain conditions, including proper water management and humidification and control of catalyst fouling constituents such as carbon monoxide (CO), for effective operation.

The electrically conductive plates sandwiching the MEAs may contain an array of grooves in the faces thereof that define flow fields for distributing the fuel cell's gaseous reactants (i.e., hydrogen and oxygen) or coolant over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels. The fluid flowing to the flow field passes through an opening on the plate such that the fluid flows along a portion of both faces of the plate. The flowing of the fluid through the opening, however, results in a pressure drop which represents lost energy which is undesirable.

Typically, nonconductive gaskets or seals provide a seal and electrical insulation between the several plates of the fuel stack. In addition, the seals provide a flow path for the gaseous reactants from the supply header to the faces of the respective anode and cathode flow fields. Conventionally, the seals comprise a molded compliant material such as rubber. The molded rubber seals, however, are not suited to high-volume manufacture due to requiring several minutes of cure time and the difficulty of quickly and accurately placing the floppy seals on the plates. Additionally, the molded rubber seals are not conducive to use with a single piece conductive plate due to the lack of a seal support feature on portions of the single piece plate between the flow field and the headers.

SUMMARY OF THE INVENTION

The present invention is directed to a stamped bridge member that defines a flow path between a header and a flow field on a fuel cell plate. A bridge member according to the principles of the present invention also provides a support surface on which a seal can be positioned to seal the plate against adjacent plates or MEAs. The present invention is also directed at a stamped plate having flow fields on two surfaces that maintain a fluid flowing between a supply header and a return header on a single surface of the plate.

A fuel cell according to the principles of the present invention includes at least one plate having a flow field portion with a flow field thereon. The flow field directs a fluid along a surface of the plate. There is also at least one header portion having at least one aperture though which the fluid flows. There is at least one bridge member surrounding the aperture and sealed to the surface of the plate. The bridge member has a plurality of passageways therein through which the fluid flows between the aperture and the flow field.

In another aspect, a fuel cell according to the principles of the present invention includes a plate having a flow field portion with a flow field thereon. The flow field directs a fluid along a surface of the plate. There is at least one header portion having at least one aperture through which the fluid flows. There is also a portion of an end of the flow field that tapers away from the aperture along the surface. A distance between the portion of the end of the flow field and the aperture changes along the surface.

In another aspect according to the principles of the present invention a fuel cell includes at least one plate having opposite first and second surfaces. The plate has a supply header portion and a return header portion. Each of the surfaces has a flow field portion. There are a plurality of supply apertures in the supply header portion for supplying fluids to the plate. There are also a plurality of return apertures in the return header portion for receiving fluids supplied to the plate by the supply apertures. There is a first flow field located on the flow field portion of the first surface. The first flow field directs a first fluid across the first surface. The first flow field has a plurality of channels separated by lands and the first fluid flows through these channels. There is a second flow field located on the flow field portion of the second surface that directs a second fluid across the second surface. The second flow field has a plurality of channels separated by lands and the second fluid flows through these channels. The channels and lands of the first flow field respectively form the lands and channels of the second flow field which results in the second flow field being an inverse of the first flow field. The first and second fluids remain on the first and second surfaces respectively when flowing between the supply and return apertures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 5A-D are plan views of a cathode bridge member, a coolant bridge member, an anode bridge member, and a no-flow anode bridge member respectively;

FIGS. 6A-C are cross-sectional views of the cathode bridge member of FIG. 5A along line 6A-A, 6B-6B and 6C-C respectively;

FIG. 7B is a cross-sectional view of a portion of the stack of fuel cells of FIG. 7A along line 7B-7B; and FIG. 7C is a cross-sectional view of the stack of fuel cells of FIG. 7A along line 7C-7C.

DETAILED DESCRIPTION OF THE PREFERRED EMBODIMENT

The following description of the preferred embodiment is merely exemplary in nature and is in no way intended to limit the invention, its application, or uses.

Figure 1:
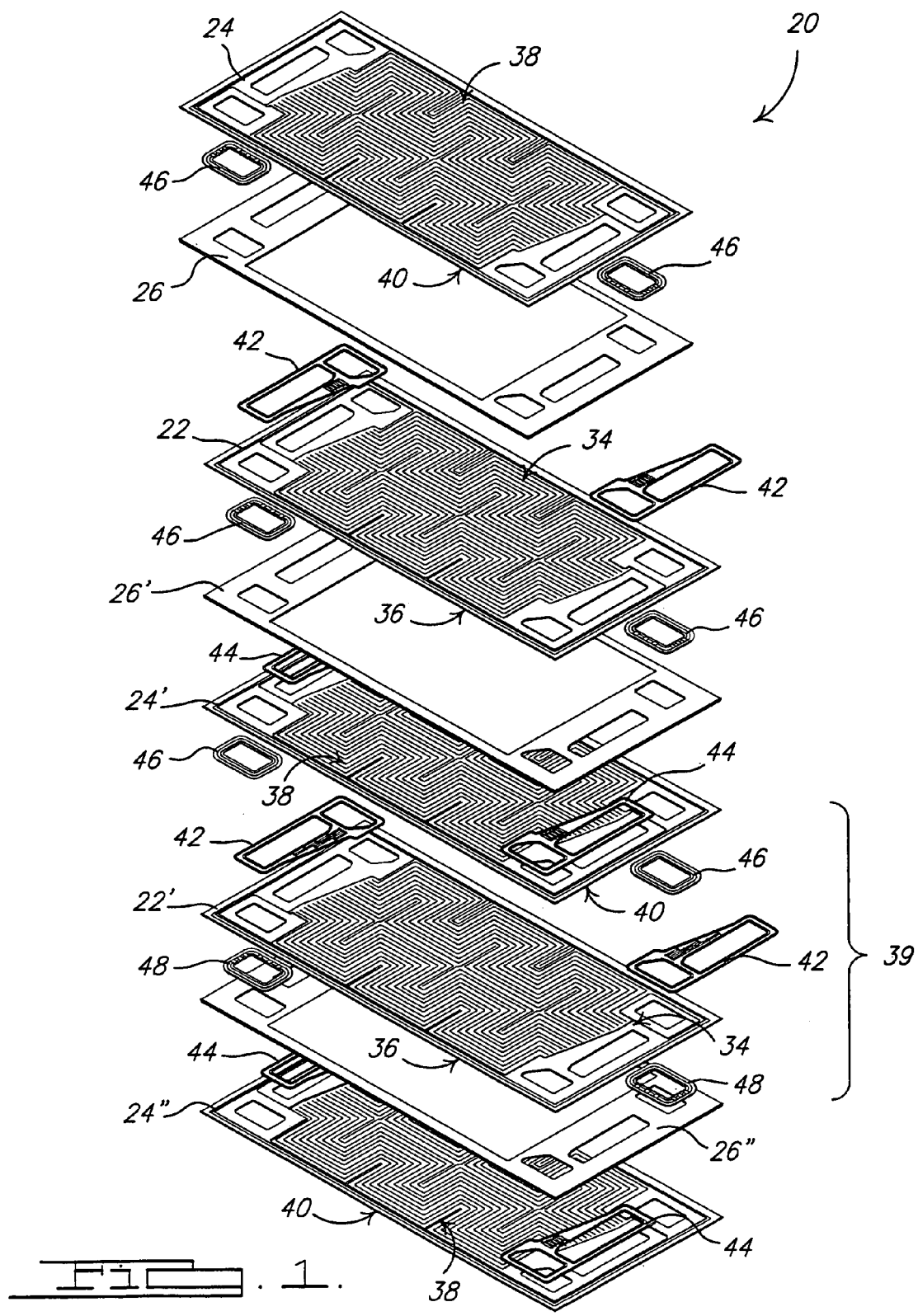
FIG. 1 is an exploded view of a stack of fuel cells according to the principles of the present invention.
Figure 2:
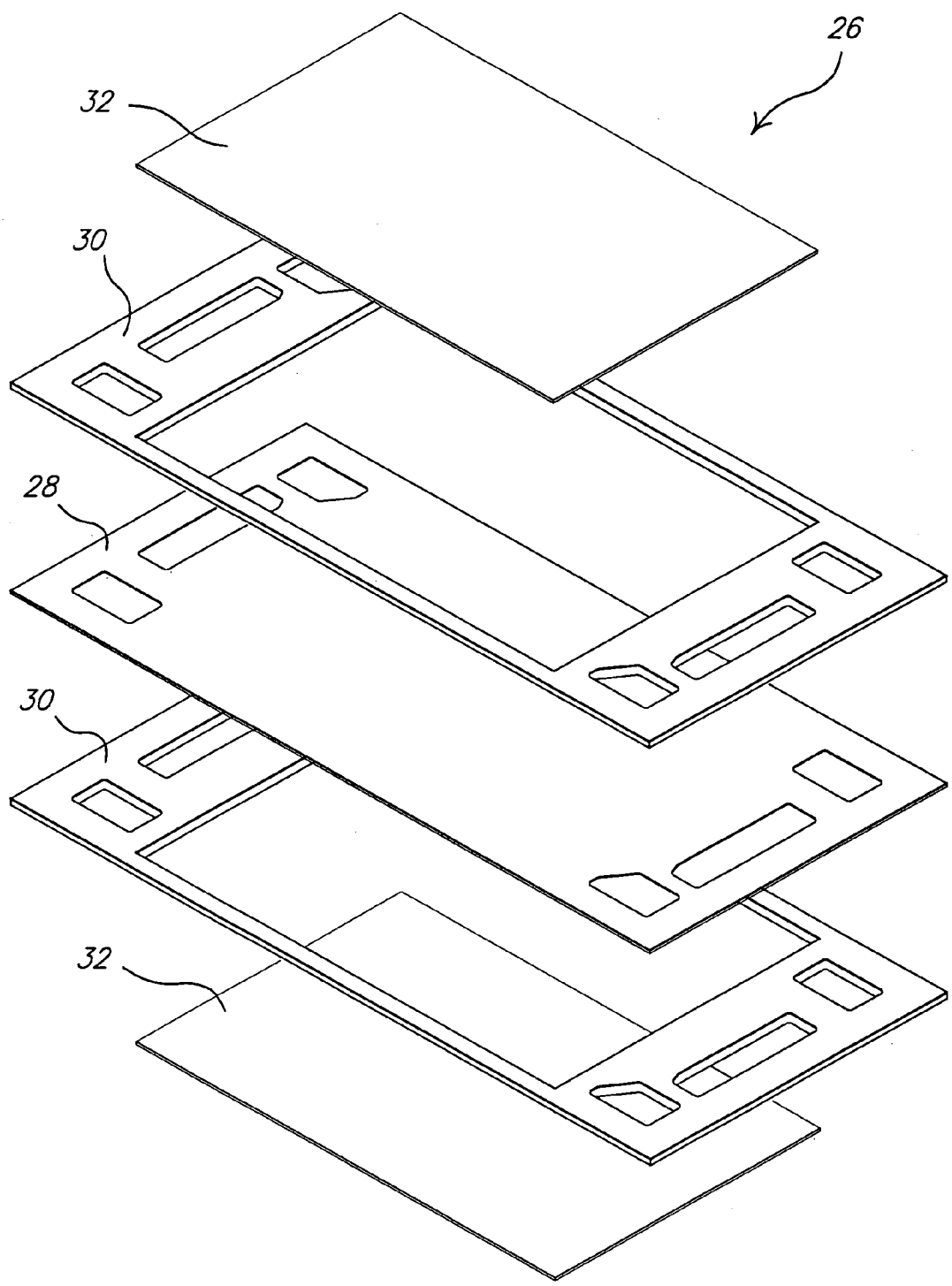
FIG. 2 is an exploded view of a unitized MEA.

FIG. 1 depicts an exploded view of a stack of fuel cells 20 according to the principles of the present invention. Stack 20 is comprised of two different plates that are arranged in a repeating sequence. Specifically, fuel cell stack 20 has a plurality of A plates 22 and a plurality of B plates 24 that are arranged in a repeating sequence to form fuel cells that are stacked on top of one another. Plates 22, 24 are non-porous, electrically conductive plates. There is a unitized MEA 26 positioned between adjacent plates 22, 24. Each unitized MEA 26, as shown in FIG. 2, includes an MEA 28, a pair of gaskets 30, and a pair of diffusion media sheets 32. MEA 28 is positioned between gaskets 30 which are nonconductive gaskets that provide a seal and electrical insulation between the several plates of the fuel cell stack. The diffusion media sheets 32 are positioned on the major faces of the MEA 28 so as to cover the active faces thereof. Diffusion media sheets 32 are porous, gas permeable, electrically conductive sheets that press up against the electrode faces of the MEA 28 and serve as primary current collectors for the electrodes. Diffusion media sheets 32 also provide mechanical support for MEA 28, especially at locations where MEA 28 is otherwise unsupported in the flow field. Suitable diffusion media sheets 32 include carbon/graphite, paper/cloth, fine mesh noble metal screens, open-cell noble metal foams, and the like which conduct current from the electrodes while allowing gas to pass therethrough. The MEA 28, gaskets 30 and diffusion media sheets 32 are preassembled together to form a unitized MEA 26 that is used between adjacent plates 22, 24 to form stack of fuel cells 20.

Plates 22, 24 are arranged in a specific sequence so that a first surface 34 of A plate 22 always faces a unitized MEA 26 and a cathode reactant gas flows between first surface 34 and unitized MEA 26. Second surface 36 of A plate 22 faces either a unitized MEA 26, in which case an anode reactant gas flows between second surface 36 and unitized MEA 26, or faces a first surface 38 of a B plate 24, in which case a coolant flows between second surface 36 of A plate 22 and first surface 38 of B plate 24. When a second surface 36 of an A plate 22 faces a first surface 38 of a B plate 24 the two plates form a bipolar coolant plate 39 that removes heat from the unitized MEAs 26 that are positioned on the outer surfaces of the coolant plate. B plate 24 is arranged so that first surface 38 always faces a second surface 36 of an A plate 22 and has a coolant flowing between the first surface 38 of B plate 24 and second surface 36 of A plate 22. A second surface 40 of B plate 24 always faces a unitized MEA 26 and has an anode reactant gas flowing between second surface 40 and unitized MEA 26.

There are a plurality of bridge members that are positioned in the header portions of the plates 22, 24 and surround one or more apertures in the header potions. Specifically, there are cathode bridge members 42, coolant bridge members 44, anode bridge members 46 and no-flow anode bridge members 48. Bridge members 42, 44, 46, 48 are positioned in the header portions of plates 22, 24 to provide a support surface for the gasket members of unitized MEA 26 and to provide desired flow paths between apertures in the header portions of plates 22, 24 and a flow field on plates 22, 24, as discussed below.

Figure 3A:
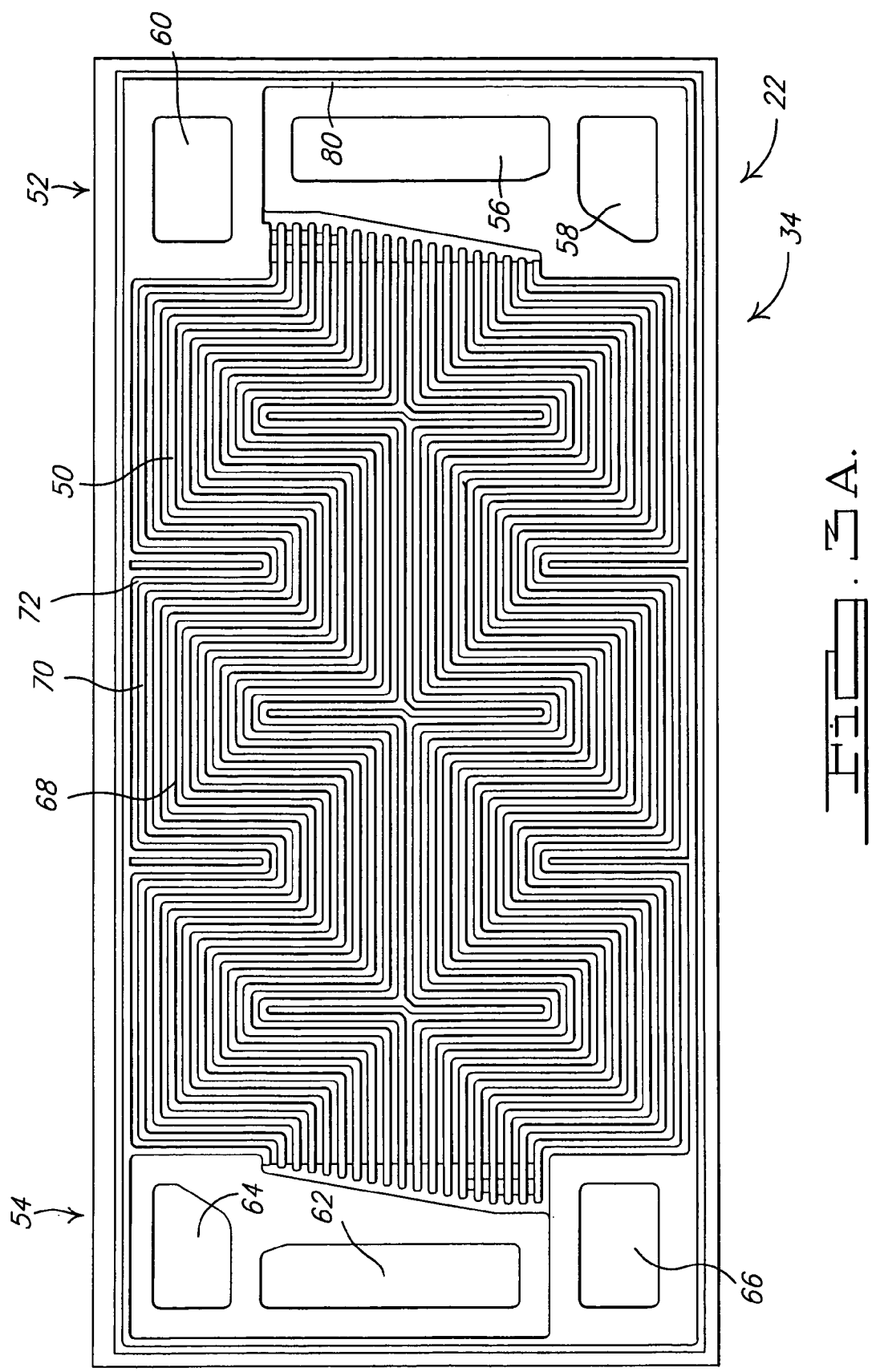
FIGS. 3A and B are plan views of the two surfaces of an A plate according to the principles of the present invention.

In FIGS. 3A and B, 4A and B, 5A-D and 7A, there are elevation changes and the darker lines represent a higher or raised surface relative to the lighter or thinner lines which represent lower surfaces. In other words, there is an elevation difference between the darker lines and the lighter lines with the darker lines representing a higher elevation in the view depicted.

Referring now to FIGS. 3A and B, first and second surfaces 34, 36 of A plate 22 are shown in detail. The A plate 22 has a flow field portion 50 located generally in the middle of A plate 22, a supply header portion 52 located near an end margin of A plate 22 and a return header portion 54 located near the other end margin of A plate 22. Supply header portion 52 includes a plurality of supply apertures 56, 58, 60 through which cathode reactant gas (oxygen or air), coolant and anode reactant gas (hydrogen) flow respectively. Similarly, return header portion 54 includes return apertures 62, 64, 66 through which the cathode reactant gas, coolant and anode reactant gas respectively flow. Apertures 56, 58, 60 in supply header portion 52 are operable to supply the desired fluid to the surfaces of A plate 22 while apertures 62, 64, 66 are operable to receive the fluid flowing over A plate 22, as discussed below. There is a first flow field 68 located in flow field portion 50 on first surface 34 of A plate 22. First flow field 68 includes a plurality of lands 70 that are operable to support unitized MEA 26 and a plurality of channels 72 therebetween that provide a flow path for a fluid flowing through first flow field 68. As stated above, first surface 34 of A plate 22 always faces a unitized MEA 26 and will always receive a cathode reactant flow through channels 72 in first flow field 68.

Figure 3B:
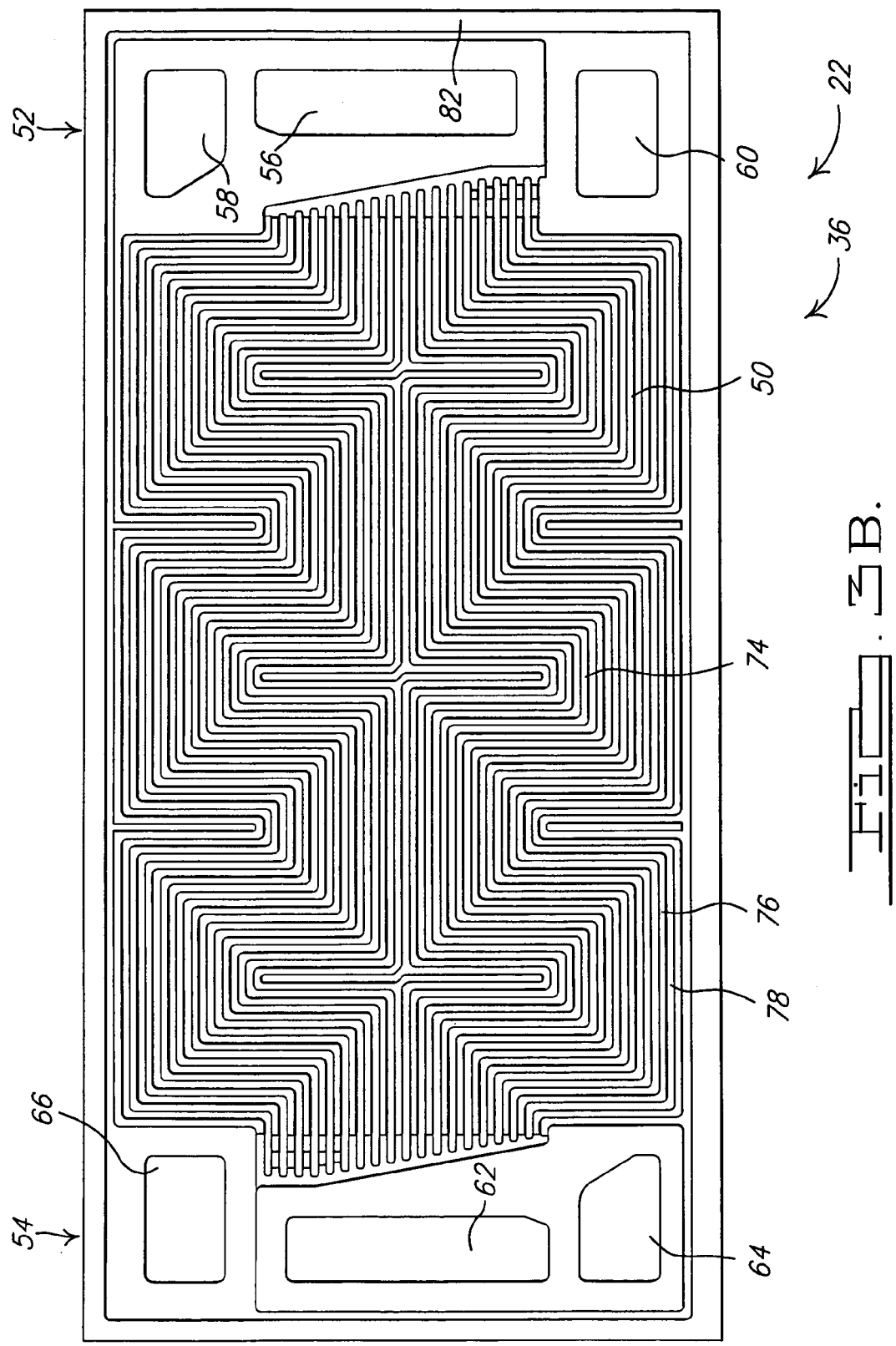

Similarly, as shown in FIG. 3B, there is a second flow field 74 located on flow field portion 50 of second surface 36 of A plate 22. Second flow field 74 has a plurality of lands 76 which either support a unitized MEA 26 or contact opposing lands on first surface 38 of B plate 24, as described below. Second flow field 74 also has a plurality of channels 78 between lands 76 and through which either an anode reactant gas or a coolant flows, as described below.

The A plate 22 is preferably stamped from a rigid metal sheet, such as stainless steel, and coated with an electrically conductive material to provide a low electrical contact resistance. Because A plate 22 is stamped, the lands and channels 70, 72 of first surface 34 form the respective channels and lands 78, 76 of second surface 36. In other words, each channel 72 on first surface 34 corresponds to a land 76 on second surface 36 while each channel 72 on first surface 34 corresponds to a land 76 on second surface 36. This results in second flow field 74 being an inverse of first flow field 68. Flow fields 68, 74 provide a single pass serpentine flow path for a fluid flowing between supply and return header portions 52, 54.

Each surface 34, 36 of A plate 22 has respective perimeter sealing surfaces 80, 82 with sealing surface 82 on second surface 36 being wider than sealing surface 80 on first surface 34. Sealing surfaces 80, 82 are used to seal against an adjacent unitized MEA 26 or against an opposing surface of a B plate 22.

A majority of the end portions of first and second flow fields 68, 74 adjacent header portions 52, 54 taper away from cathode apertures 56, 62 as the end portions of flow fields 68, 72 extend along the respective first and second surfaces 34, 36 toward the respective coolant apertures 60, 64. The tapering of the end portions of flow fields 68, 74, provides for a larger flow volume along the end portions of the flow fields that feed the largest number of channels while reducing the flow volume along the end portions of the flow field that feed a reducing number of channels. In other words, the tapering of the end portion of the flow fields facilitates the flow of coolant from coolant aperture 58 into the channels of the flow field with an adequate quantity of coolant flowing through all of the channels. Similarly, the tapering on the end of the flow field adjacent the return header portion 54 facilitates the collection of the coolant flowing through the channels and into coolant return aperture 64. Thus, the tapering of the end portions of the flow fields facilitate a more even distribution and flow of coolant through the various channels that comprise the flow fields.

Figure 4A:
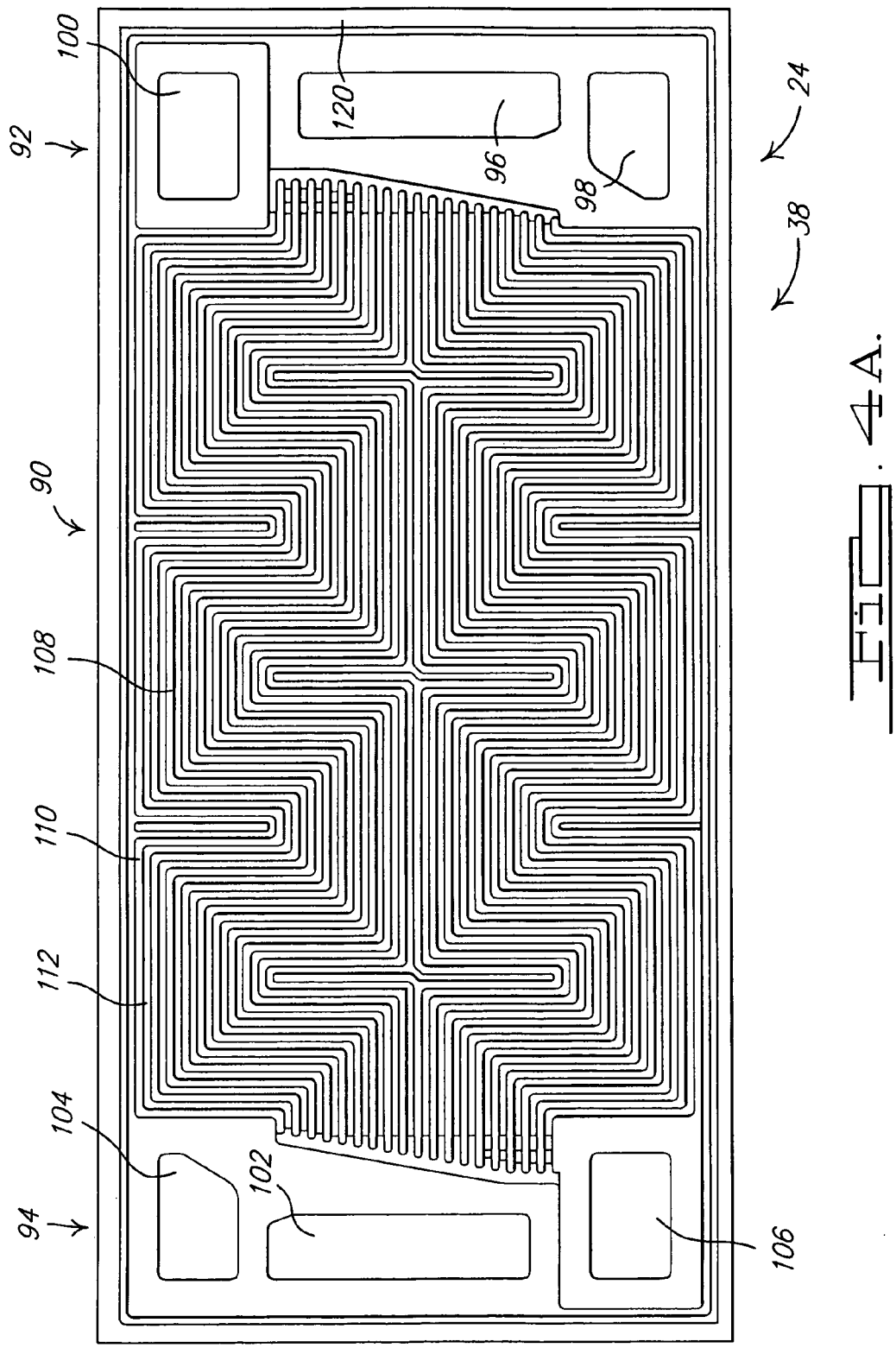
FIGS. 4A and B are plan views of the two surfaces of a B plate according to the principles of the present invention.
Figure 4B:
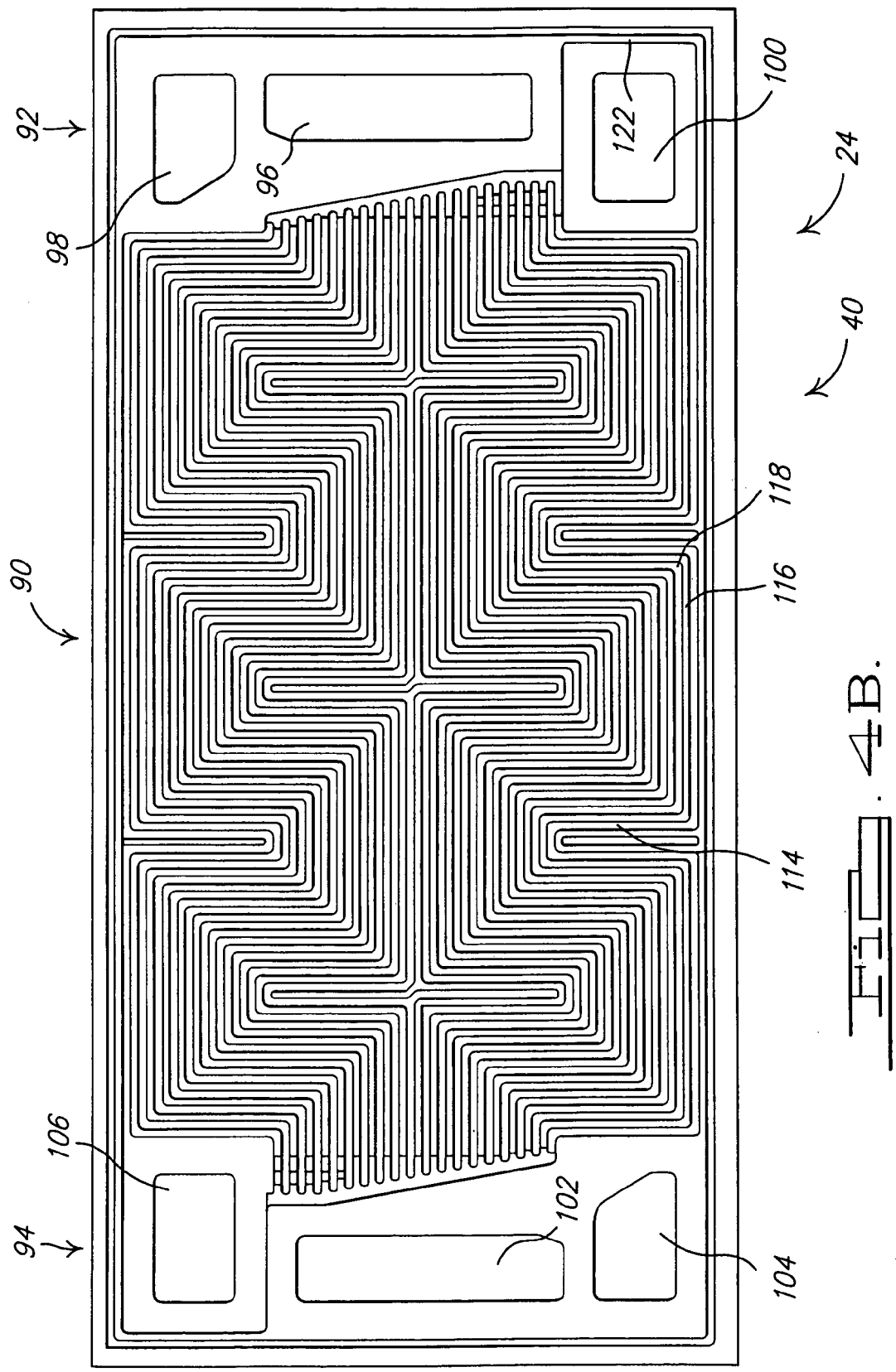

Referring now to FIGS. 4A and B, the respective first and second surfaces 38, 40 of a B plate 24 are shown. The B plate 24 includes a flow field portion 90 for directing a fluid across the surfaces of B plate 24, a supply header portion 92 for supplying fluids to B plate 24 and a return header portion 94 for receiving fluids that flow across B plate 24. Supply header portion 92 has a plurality of apertures 96, 98, 100 through which a cathode reactant gas, a coolant fluid, and an anode reactant gas respectively flow. Similarly, return header portion 94 includes a plurality of return apertures 102, 104, 106 that respectively receive the cathode reactant gas, coolant fluid and anode reactant gas that have flown across the surface of B plate 24.

There is a first flow field 108 in flow field portion 90 on first surface 38 of B plate 24. First flow field 108 includes a plurality of lands 110 that will engage with lands 76 on second surface 36 of an A plate 22 and a plurality of channels 112 between lands 110 and through which a coolant fluid flows. With lands 110 on first surface 38 of B plate 24 designed to engage with lands 76 on second surface 36 of an adjacent A plate 22, first flow field 108 on B plate 24 is substantially a mirror image of second flow field 74 on A plate 22. In other words, a majority portion of first flow field 108 is a mirror image of a majority portion of second flow field 74 on A plate 22 so that when second surface 36 of A plate 22 is positioned adjacent first surface 38 of B plate 24, lands 76 on A plate 22 are generally aligned and engaged with lands 110 on B plate 22 with the respective channels 78, 112 also generally aligned so that a coolant fluid can flow through the combined channels 78, 112 which are separated by a combined lands 76, 110. A second flow field 114 is located on flow field portion 90 of second surface 40 of B plate 24. Second flow field 114 includes a plurality of lands 116 which provide support for a unitized MEA 26 and a plurality of channels 118 between lands 116 through which an anode reactant gas flows between anode supply aperture 100 and anode return aperture 106.

First and second surfaces 38, 40 of B plate 24 each have respective perimeter sealing surfaces 120, 122. Sealing surface 120 on first surface 38 is wider than sealing surface 122 on second surface 40. Sealing surface 120 on first surface 38 of B plate 24 engages with sealing surface 82 on second surface 36 of an adjacent A plate 22, as described below. Sealing surface 122 on second surface of 40 of B plate 24 seals against a unitized MEA 26.

The B plate 24 is also preferably stamped from a rigid metal sheet, such as stainless steel, and coated with an electrically conductive material to provide a low electrical contact resistance. Because B plate 24 is stamped, lands 110 and channels 112 on first surface 38 of first flow field 108 form the respective channels 118 and lands 116 of second flow field 114. In other words, lands 110 on first surface 38 correspond to channels 118 on second surface 40 while channels 112 on first surface 38 correspond to lands 116 on second surface 40. With this arrangement, second flow field 114 is an inverse of first flow field 108. Flow fields 108, 114 provide a single pass serpentine flow path for a fluid flowing between supply and return header portions 92, 94.

Referring now to FIGS. 5A-D, top plan views of bridge members 42, 44, 46, 48 are shown. The bridge members provide a seal around one or more of the apertures in the A and B plates 22, 24 and also are designed to be flush with raised portions of the plates to provide a support surface on which a sealing member can be positioned to seal between adjacent plates or unitized MEA 26, as discussed below. Each bridge member 42, 44, 46, 48 is attached to one of the surfaces of plates 22, 24. Bridge members 42, 44, 46, 48 can be attached to a surface of plates 22, 24 with an adhesive, by brazing or by other means. Additionally, bridge members 42, 44, 46, 48 can have an adhesive coating that provides a fluid tight seal between the bridge member and the plate. Bridge members 42, 44 and 46 provide a fluid passageway between one of the apertures in the header portions and a flow field to allow a fluid to flow between the apertures and the flow field. No-flow anode bridge member 48, however, does not provide a fluid passageway but rather prevents the flow of an anode reactant gas beyond the anode aperture around which the no-flow anode bridge member 48 is positioned.

Bridge members 42, 44, 46, 48 are preferably stamped from a rigid metal, such as stainless steel or the like. The stamping of bridge members 42, 44, 46, 48 provides two distinct levels of elevation with a low spot on one side corresponding to a high spot on the other side and vice versa. The use of a stamped metal for producing bridge members 42, 44, 46, 48 provides for a low cost efficient manner of mass producing the bridge members for use in assembling fuel cells and a fuel cell stack.

Referring now to FIG. 5A, a cathode bridge member 42 is shown. Cathode bridge member 42 is inserted between first surface 34 of an A plate 22 and a unitized MEA 26. Cathode bridge member 42 is configured to fit within header portions 52, 54 on first surface 34 of an A plate 22 while surrounding both the cathode and coolant apertures therein. Cathode bridge member 42 includes a cathode opening 130 and a coolant opening 132 that surround the respective cathode and coolant apertures in the header portions on which cathode bridge member 42 is positioned and allow the cathode reactant gas and coolant fluid to flow throughout the header portions of adjacent plates. Cathode bridge member 42 includes a lower perimeter sealing surface 134 that extends along a periphery of cathode bridge member 42, a lower coolant sealing surface 136 that surrounds a perimeter of the coolant aperture, and a lower cathode sealing surface 138 that surrounds the perimeter of the cathode aperture. As stated above, cathode bridge member 42 is sealingly secured to the plate such as by an adhesive or brazing. The sealing of cathode bridge member 42 to the plate results in lower sealing surfaces 134, 136, 138 forming fluid tight seals against the surface of the plate, thereby preventing flow from the header portions to the flow fields thereon. Similarly, cathode bridge member 42 has an upper sealing surface 140 that extends along the periphery of cathode bridge member 42 and surrounds a periphery of coolant opening 132 and a periphery of cathode opening 130. Upper sealing surface 140 provides an elevated supporting surface that is substantially flush with the raised area of the header portion surrounding the anode apertures and thereby provides a substantially planar surface that can be sealed against a unitized MEA 26, when positioned on A plate 22. Thus, as shown in FIG. 6B, cathode bridge member 42 has upper and lower sealing surfaces that are used to provide respective fluid tight seals between sections of each of header portion 52, 54 of first surface 34 of an A plate 22 and a unitized MEA 26.

Cathode bridge member 42, in addition to providing upper and lower sealing surfaces, also allows for the flow of cathode reactant gas from cathode supply aperture 56, to first flow field 68 and into cathode return aperture 62. To facilitate this flow, cathode bridge member 42 has a first set of ports 146 formed in an inner peripheral wall 140*i* adjacent cathode opening 130 and a second set of ports 148 formed in an outer peripheral wall 140*o* adjacent first flow field 68, as shown in FIGS. 5A and 6A. Passageways 146, 148 represent openings in cathode bridge member 42 between upper sealing surface 140 and lower sealing surfaces 138, 134. These openings allow the cathode reactant gas to flow from a cathode aperture, through first set of passageways 146 then between cathode bridge member 42 and first surface 34 of A plate 22 then through second set of passageways 148 and into channels 72 of first flow field 68 when positioned on supply header portion 52 and vice versa when positioned on return header portion 54. To provide additional support for the large span portion of the upper sealing surface between first and second passageways 146, 148, cathode bridge member includes a plurality of convolutions 152 that extend between the upper and lower elevations to provide support between first surface 34 of A plate 22 and upper sealing surface 140 of cathode bridge member 42, as shown in FIGS. 5A and 6C. In other words, convolutions 152 include a lower portion 154 that is in contact with first surface 34 of A plate 22 and an upper portion 156 that forms a portion of upper sealing surface 140 of cathode bridge member 42. As shown in FIG. 6C, the ends of convolutions 152 are open to allow cathode reactant gas to flow therethrough. Convolutions 152 are oriented generally in the direction of cathode reactant flow between the cathode aperture and the flow field to minimize the obstruction of the cathode reactant gas flow. Thus, cathode bridge member 42 forms a bridge that provides an upper sealing surface that is flush with the raised elevation features on first surface 34 of A plate 22 while allowing a flow of cathode reactant gas between first surface 34 of A plate 22 and the upper surface of cathode bridge member 42 and preventing a coolant fluid from entering first flow field 68.

Referring now to FIG. 5B, a coolant bridge member 44 is shown. Coolant bridge member 44 has the same peripheral profile as cathode bridge member 42. Coolant bridge member 44 is inserted between first surface 38 of a B plate 24 and second surface 36 of an A plate 22 when forming a coolant plate 39. Coolant bridge member 44 is configured to fit within header portions on first surface 38 of B plate 24 surrounding the coolant and cathode apertures therein. Coolant bridge member 44 includes a cathode opening 160 that is configured to surround the cathode aperture in first surface 38 of B plate 24 and a coolant opening 162 that is configured to surround the coolant aperture in first surface 38 of B plate 24. Coolant bridge member 44 includes a lower perimeter sealing surface 164 that extends along the periphery of coolant bridge member 44, a lower coolant sealing surface 166 that extends around the periphery of coolant opening 162 and a lower cathode sealing surface 168 that extends around cathode opening 160. Lower sealing surfaces 164, 166, 168 are sealed to first surface 38 of B plate 24 by an adhesive, brazing or other similar methods to provide a fluid tight seal, as stated above. Coolant bridge member 44 has an upper sealing surface 170 that extends along the periphery of coolant bridge member 44 and surrounds a periphery of coolant opening 162 and a periphery of cathode opening 160. Upper sealing surface 170 provides an elevated supporting surface that is substantially flush with the raised area of the header portion surrounding the anode apertures and thereby provides a substantially planar surface that can be sealed against the raised area of header portions on second surface 36 of an A plate 22 when forming coolant plate 39. Upper sealing surface 170 has an elastomeric material or sealing adhesive applied thereto to facilitate sealing between upper sealing surface 170 and the raised areas of the header portions on second surface 36 of A plate 22. Thus, coolant bridge member 44 has upper and lower sealing surfaces that are used to provide respective fluid tight seals between sections of each header portion 92, 94 of first surface 38 of a B plate 24 and raised sections of header portions 52, 54 of second surface 36 of an A plate 22.

Coolant bridge member 44 includes a first set of ports 176 that are positioned adjacent the periphery of coolant opening 162 and a second set of ports 178 positioned along a portion of the periphery of coolant bridge member 44 that will be adjacent first flow field 108 when positioned on a B plate 24. First and second sets of ports 176, 178 allow a coolant fluid to flow between coolant apertures 98, 104 and first flow field 108 on B plate 24. When the coolant fluid flows between first and second ports 176, 178, the coolant fluid flows between first surface 38 of B plate 24 and the underside of upper sealing surface 170 of coolant bridge member 44. Coolant bridge member 44 also includes a plurality of convolutions 182 that have lower and upper portions 184, 186 that provide additional support to upper sealing surface 170 between cathode opening 160 and second set of ports 178. Convolutions 182 are arranged to extend generally parallel to cathode opening 160 thereby being generally parallel with the coolant fluid flow direction and minimizing the obstruction to coolant fluid flowing between first and second sets of ports 176, 178. Thus, coolant bridge member 44 provides a fluid tight seal between the recessed header portions on first surface 38 of B plate 24 and the raised header portions of second surface 36 on A plate 22, prevents cathode reactant from entering first flow field 108 of B plate 24 and allows a coolant fluid to flow from coolant supply aperture 98, through first flow field 108 and into coolant fluid return aperture 104.

Referring now to FIG. 5C, an anode bridge member 46 is shown. Anode bridge member 46 is inserted between either second surface 36 of an A plate 22 and a unitized MEA 26 or between second surface 40 of a B plate 24 and a unitized MEA 26. Anode bridge member 46 is configured to fit within the recessed header portions of second surfaces 36, 40 on plates 22, 24 and surrounds the anode aperture therein. Anode bridge member 46 has an anode opening 190 that surrounds the anode aperture on plates 22, 24 when positioned thereon. Anode bridge member 46 includes a lower perimeter sealing surface 192 that extends along a periphery of anode bridge member 46 and a lower anode sealing surface 194 that extends around the periphery of anode opening 190. Lower sealing surfaces 192, 194 are sealed against the second surfaces 36, 40 of plates 22, 24, such as by an adhesive or brazing, and provide a fluid tight seal therebetween. Anode bridge member 46 also has an upper sealing surface 196 that engages with a unitized MEA 26 and provides a fluid tight seal therebetween. Upper sealing surface 196 provides an elevated sealing surface that is substantially flush with the raised area of the header portions surrounding cathode and coolant apertures on second surfaces 36, 40 on one of a respective A plate 22 or B plate 24 and provides an elevated sealing surface that can be sealed against a unitized MEA 26. There is a set of ports 198 that extend through upper sealing surface 196 to allow anode reactant gas to flow between an anode aperture and a flow field on the plate. Thus, anode bridge member 46 provides upper and lower sealing surfaces that form fluid tight seals between the surfaces of plates 22, 24 and a unitized MEA 26 while allowing anode reactant gas to flow between the anode reactant apertures and the flow field thereon while preventing coolant from flowing into the flow field.

Referring now to FIG. 5D, a no-flow anode bridge member 48 is shown. No-flow anode bridge member 48 is inserted between second surface 36 of an A plate 22 and first surface 38 of a B plate 24 when forming a coolant plate 39. No-flow anode bridge member 48 is configured to be positioned in the recessed header portions on second surface 36 of A plate 22 surrounding the anode apertures thereon. No-flow anode bridge member 48 prevents the flowing of anode reactant through the flow field on the plate on which it is secured. No flow-anode bridge member 48 includes an anode opening 200 that surrounds the anode aperture on the plate on which no flow anode bridge member 48 is positioned. No-flow anode bridge member 48 also has a lower perimeter sealing surface 202 surrounding a periphery of no flow anode bridge member 48, a lower anode sealing surface 204 that surrounds a periphery of anode opening 202 and an upper sealing surface 206 therebetween that surrounds anode opening 200. Lower sealing surfaces 202, 204 are sealed against second surface 36 of an A plate 22 by an adhesive or through brazing, as discussed above. Upper sealing surface 206 provides a flush sealing surface with the elevated sections in the header portions on second surface 36 on A plate 22. Upper sealing surface 206 is provided with an adhesive or elastomeric material to provide a fluid tight engagement between upper surface 206 and the elevated header portions surrounding the anode apertures on first surface 38 of a B plate 24. No-flow anode bridge member 48, however, does not contain any ports and does not allow fluid to flow between the anode aperture which it surrounds and the adjacent flow field. Thus, no-flow anode bridge member 48 acts as a gasket or sealing member to allow a flow of anode reactant gas through the header portions but does not allow the anode reactant gas to flow through an adjacent flow field.

Referring now to FIG. 1, the construction of the stack of fuel cells 20 will be discussed. The A and B plates 22, 24 are arranged in a repeating pattern to form a plurality of fuel cells that are adjacent one another and form stack of fuel cells 20. Specifically, plates 22, 24 are arranged in a BAABA repeating pattern which forms a stack of fuel cells wherein each unitized MEA 26 is cooled on one side thereof, as discussed below. The pattern may be repeated or reduced to provide a stack of a desired number of fuel cells.

The following discussion of the forming of fuel cells according to the principles of the present invention will begin with the use of a B plate 24. It should be appreciated, however, that this discussion is merely exemplary and other starting points can be used to describe the present invention. A first fuel cell is formed by positioning a unitized MEA 26 between opposing B and A plates 24, 22. Specifically, a pair of anode bridge members 46 are secured to recessed areas on header portions 92, 94 on second surface 40 of a B plate 24 and thereby provide a substantially level sealing surface on second surface 40 of B plate 24 which includes the raised areas of header portions 92, 94 surrounding the cathode apertures 96, 102 and coolant apertures 100, 104, upper sealing surface 196 of anode bridge member 46, and perimeter sealing surface 122 on second surface 40 of B plate 24. These flush sealing surfaces are positioned against a unitized MEA 26 and provide a fluid tight seal when the stack of fuel cells is compressed. A pair of cathode bridge members 42 are secured in the recessed areas of header portions 52, 54 on first surface 34 of an A plate 22 and thereby provide a generally planar or flush sealing surface that includes upper sealing surface 140 of cathode bridge member 42, the elevated areas of header portions 52, 54 on first surface 34 of A plate 22 and perimeter sealing surface 80 on first surface 34 of A plate 22 that forms a fluid tight seal when compressed against unitized MEA 26. Anode bridge member 46 allows anode reactant gas to flow along the second flow field 114 on B plate 24 while cathode bridge member 42 allows cathode reactant gas to flow through first flow field 68 on A plate 22 thus forming the first cell.

Another fuel cell is formed by positioning another unitized MEA 26 between second surface 36 of A plate 22 of the first fuel cell and a first surface 34 of a different A plate 22'. In this case, however, the different A plate 22' is joined to a different B plate 24' to form a coolant plate 39. That is, coolant plate 39 is formed by positioning second surface 36 of the different A plate 22' facing first surface 38 of the different B plate 24'. A pair of no-flow anode bridge members 48 are attached to the recessed areas of header portions 52, 54 on second surface 36 of the different A plate 22' while a pair of coolant bridge members 44 are attached to the recessed areas of header portions 92, 94 on first surface 38 of the different B plate 24'. The adjacent A and B plates 22', 24' are attached together, such as by laser welding or brazing or adhesive, to form coolant plate 39. With first flow field 108 of B plate 24' being substantially a mirror image of second flow field 74 of A plate 22', the lands 110, 76 and channels 112, 78 on flow fields 108, 74 are generally aligned. Coolant bridge members 44 allow coolant fluid to flow from coolant supply apertures 98, 58 through the opposing flow fields 108, 74 and into coolant return apertures 104, 64. Thus, coolant plate 39 forms a cooling cell that will remove heat from a unitized MEA 26 with which it is in contact.

With coolant plate 39 formed, the second fuel cell can then be constructed by sandwiching a unitized MEA 26' between second surface 36 of A plate 22 used in the first fuel cell and first surface 34 of A plate 22' that forms coolant plate 39. Specifically, a pair of anode bridge members 46 are attached to the recessed areas of header portions 52, 54 on second surface 36 of A plate 22 and thereby provide a substantially planar sealing surface including upper sealing surface 196 of anode bridge member 46, the raised areas of header portions 52, 54 on second surface 36 of A plate 22 and perimeter sealing surface 82 on second surface 36 of A plate 22 that forms a fluid tight seal when compressed against unitized MEA 26'. A pair of cathode bridge members 42 are attached to the recessed areas of header portions 52, 54 on first surface 34 of A plate 22' that is part of coolant plate 39 and thereby provide a generally planar sealing surface that includes upper sealing surface 140 of cathode bridge member 42, the raised area of header portions 52, 54 on first surface 34 of A plate 22' and perimeter sealing surface 80 on first surface 34 of A plate 22 that is compressed against unitized MEA 26' to form a fluid tight seal therebetween. Anode bridge members 46 allow anode reactant gas to flow between anode apertures 60, 66 and through second flow field 74 on A plate 22 along one surface of unitized MEA 26 while cathode bridge members 42 enable cathode reactant gas to flow between cathode apertures 56, 62 through first flow field 68 on A plate 22' of coolant plate 39 along the other side of unitized MEA 26' thereby forming the second fuel cell. The second fuel cell is cooled by the coolant fluid flowing through coolant plate 39.

A third fuel cell is formed by compressing another unitized MEA 26" between the other side of coolant plate 39 and a third A plate 22". Specifically, a pair of anode bridge members 46 are attached to the recessed areas of header portions 92, 94 on second surface 40 of B plate 24' that is part of coolant plate 39 and is compressed against one side of unitized MEA 26 to form a fluid tight seal therebetween. A pair of cathode bridge members 42 are attached to the recessed areas of header portions 52, 54 on first surface 34 of a third A plate 22" and are compressed against the opposite side of unitized MEA 26. Anode inserts 46 enable anode reactant gas to flow between anode apertures 100, 106 through second flow field 114 on B plate 24' and along one surface of unitized MEA 26, while cathode bridge members 42 enable cathode reactant gas to flow between cathode apertures 56, 62 and through first flow field 68 on A plate 22" along the other surface of unitized MEA 26" thus forming the third fuel cell. Additional fuel cells according to the principles of the present invention can be completed by following the BAABA pattern.

Figure 7A:
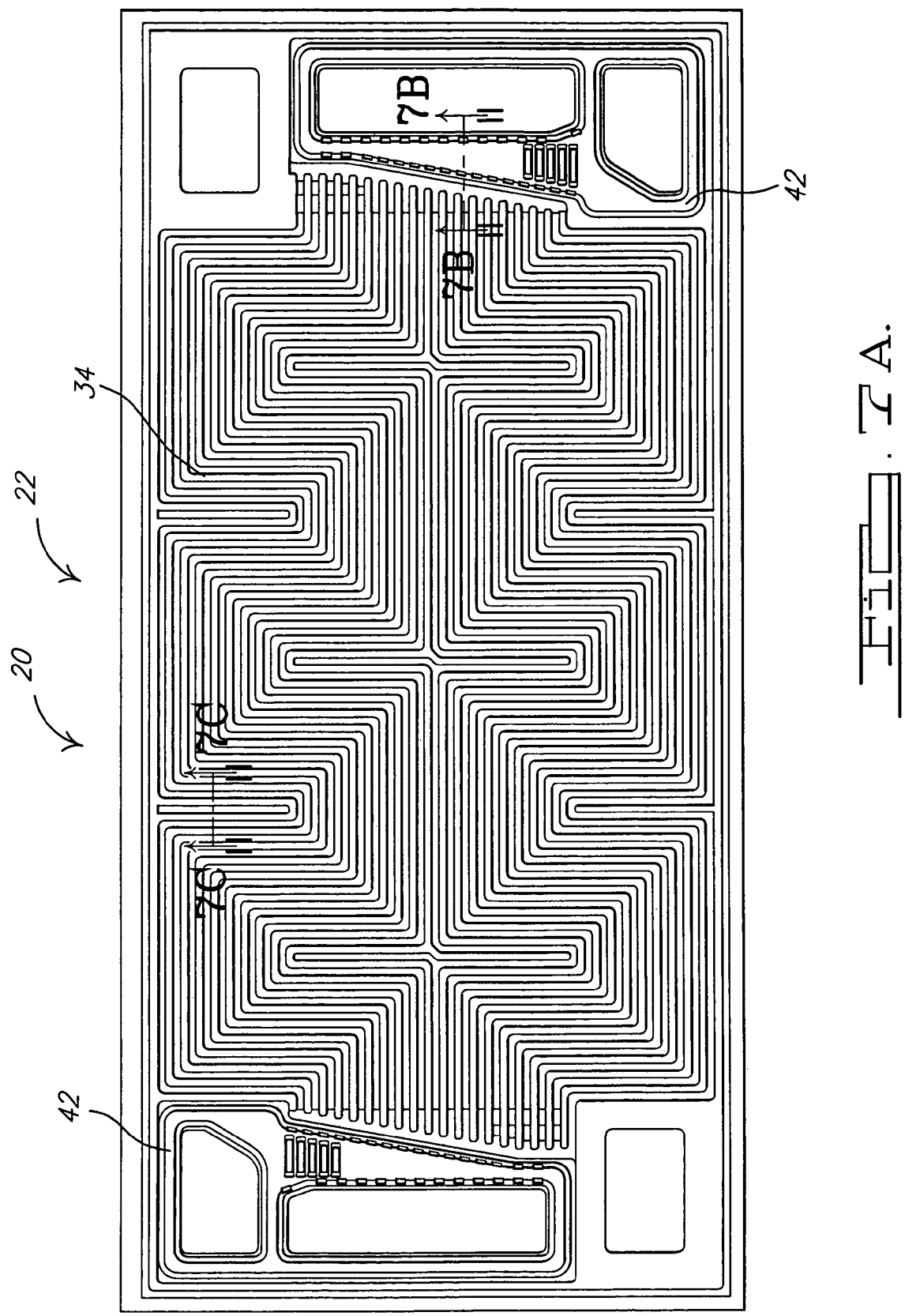
FIG. 7A is a plan view of a stack of fuel cells according to the principles of the present invention.

Referring now to FIG. 7A, a plan view of a stack of fuel cells 20 according to the principles of the present invention is shown with a first surface 34 of an A plate 22 shown. A portion of the resulting cathode supply header and the cathode reactant gas that flows to the various fuel cells that comprise the stack of fuel cells 20, is shown in FIG. 7B. That is, FIG. 7B is a cross-sectional view through a stack of fuel cells 20 of FIG. 7A along lines 7B-7B with the cross section extending into the page. As can be seen, the cathode header along the right side of FIG. 7B provides cathode reactant gas to the fuel cells. The plates that have a cathode bridge member 42 thereon allow the cathode reactant gas to flow from the cathode header to the flow field on the associated plate by flowing through first set of ports 146 then between upper sealing surface 140 and the plate then through second set of ports 148 and into the associated flow field. In contrast, where the cathode reactant gas encounters a coolant bridge member 44, flow from the cathode header into the flow field on that plate is inhibited. The operation of coolant bridge member 44 and cathode bridge member 42 to allow a coolant to flow while preventing a cathode reactant gas from flowing is substantially identical to this and, thus, is not shown. Similarly, the operation of anode bridge member 46 and no-flow anode bridge member 48 is substantially the same as that shown in relation to cathode and coolant bridge members 42, 44 and, thus, is also not shown.

Referring now to FIG. 7C, a cross-sectional view of the stack of fuel cells of FIG. 7A along lines 7C-7C going into the page is shown. Thus, a resulting fuel cell configuration and the various fluid flows through the flow fields is shown. As can be seen, one surface of each unitized MEA 26 is in contact with a channel containing a coolant flow while opposite sides of each MEA are in contact with a cathode reactant gas and an anode reactant gas. Thus, the present invention provides for fuel cells that are arranged in a stack configuration wherein one surface of each MEA is cooled.

While the present invention has been discussed with reference to specific examples, it should be appreciated that variations that do not depart from the gist of the invention are intended to be within the scope of the invention. For example, the specific repeating pattern that is utilized between the A and B plates can be varied. Additionally, the configuration of the flow fields thereon can also be adjusted to provide a desired number of passes of a fluid along the surface of a plate. Furthermore, the arrangement of the recessed and elevated areas of the header portions can be changed to provide a desired configuration. Additionally, the configuration or orientation of the various apertures in the header portions can also be varied, Thus, the description of the invention is merely exemplary in nature and variations that do not depart from the principles of the present invention are not to be regarded as a departure from the spirit and scope of the invention.

What is claimed is:

1. A separator plate assembly for use in a fuel cell comprising:
    a one-piece plate with opposite major surfaces, said plate having a margin on at least one of said major surfaces with an aperture formed therethrough and a flow field formed in at least one of said major surfaces of said plate; and
    a bridge member distinct and separate from said plate, said bridge member in sealing contact with said margin and surrounding said aperture to provide a raised surface around said aperture, said bridge member having a first surface spaced apart from said raised surface and engaging with said margin, a peripheral wall extending between said first surface and said raised surface, and a set of ports formed in said peripheral wall between said first surface and said raised surface with a portion of said first surface, a portion of said raised surface and a portion of said peripheral wall forming a periphery of each of said ports, said set of ports providing fluid communication from said aperture to said flow field between said margin and said raised surface.

2. The separator plate assembly of claim 1 wherein said first surface is a sealing surface extending from said peripheral wall and in sealing contact with said margin.

3. The separator plate assembly of claim 1 wherein said bridge member further comprises a convolution formed in said raised surface to provide a locally depressed region in contact with said margin, thereby providing support for said bridge member while allowing fluid communication therebetween.

4. The separator plate assembly of claim 1 wherein said margin comprises a second aperture formed therethrough to provide fluid communication through said plate, a portion of said bridge member surrounding said second aperture to seal said flow field from said second aperture.

5. The separator plate assembly of claim 1 wherein said margin comprises a sealing surface formed therein adjacent said bridge member, said sealing surface and said raised surface lying in a plane generally parallel to and spaced apart from said surface of said plate.

6. The separator plate assembly of claim 5 wherein said sealing surface has a second aperture formed therein to provide fluid communication through said plate.

7. The separator plate assembly of claim 6 further comprisipg a seal disposed on one of said major surfaces of said plate opposite said flow field, said seal surrounding said second aperture and in sealing contact with said plate.

8. The separator plate assembly of claim 7 wherein said seal comprises a second bridge member in sealing contact with said plate.

9. A separator plate assembly for use in a fuel cell comprising:
  a one-piece plate having an inlet margin with an inlet aperture formed therethrough, a return margin with a return aperture formed therethrough and a flow field formed in a surface of said plate;
  an inlet bridge member distinct and separate from said plate, said inlet bridge member in sealing contact with said inlet margin and surrounding said inlet aperture to provide a first raised surface around said inlet aperture, said inlet bridge member having a set of inlet ports formed therein to provide fluid communication from said inlet aperture to said flow field between said inlet margin and said first raised surface; and
  a return bridge member distinct and separate from said plate and said inlet bridge member, said return bridge member in sealing contact with said return margin and surrounding said return aperture to provide a second raised surface around said return aperture, said return bridge member having a set of return ports formed therein to provide fluid communication from said flow field to said return aperture between said return margin and said second raised surface.

10. The separator plate assembly of claim 9 wherein each of said inlet bridge member and said return bridge member comrpise a peripheral wall extending between said margin and said raised surface, said set of ports being formed in said peripheral wall.

11. The separator plate assembly of claim 10 wherein each of said inlet bridge member and said return bridge member further comprises a sealing surface extending from said peripheral wlal and in seal contact with said respective inlet and return margins.

12. The separator plate assembly claim 9 wherein each of said inlet bridge member and said return bridge member further comprises a convolution formed in said raised surface to provide a locally depressed region in contact with said margin, thereby providing support for said each of said inlet and return bridge members while allowing fluid communication therebetween.

13. The separator plate assembly of claim 9 wherein said inlet margin comprises a second inlet aperture formed therethrough to provide fluid communication through said plate, a portion of said inlet bridge member surrounding said second inlet aperture to seal said flow field from said second inlet aperture.

14. The separator plate assembly of claim 13 wherein said return margin comprises a second return aperture formed therethrough to provide fluid communication through said plate, a portion of said return bridge member surrounding said second return aperture to seal said flow field from said second return aperture.

15. The separator plate assembly of claim 9 wherein said inlet margin comprises a sealing surface formed there in adjacent said inlet bridge member, said sealing surface and said first raised surface lying in a plane generally parallel to and spaced apart from said surface of said plate.

16. The separator plate assembly of claim 15 wherein said sealing surface has a second inlet aperture formed therein to provide fluid communication through said plate.

17. The separator plate assembly of claim 16 further comprising a seal disposed on a surface of said plate opposite said flow field, said seal surrounding said second inlet aperture and in sealing contact with said plate.

18. The separator plate assembly of claim 17 wherein said seal comprises a second inlet bridge in sealing contact with said plate.

19. The separator plate assembly of claim 9 wherein said return margin comprises a sealing surface formed therein adjacent said return bridge member, said sealing surface and said second raised surface lying in a plane generally parallel to and spaced apart from said surface of said plate.

20. The separator plate assembly of claim 19 wherein said sealing surface has a second return aperture formed therein to provide fluid communication through said plate.

21. The separator plate assembly of claim 20 further comprising a seal disposed on a surface of said plate opposite said flow field, said seal surrounding said second return aperture and in sealing contact witn sad plate.

22. The separator plate assembly of claim 21 wherein said seal comprises a second return bridge member in sealing contact with said plate.

23. A separator plate assembly for use in a fuel cell comprising:
  a one-piece plate having a first margin with a first aperture and a second aperture formed therethrough, said plate having a second margin with a third aperture and a fourth aperture formed therethrough, a first flow field formed in a first surface of said plate and a second flow field formed in a second surface of said plate;
  a first bridge member separate and distinct from said plate, said first bridge member in sealing contact with said first margin on said first surface and surrounding said first aperture to provide a first raised surface around said first aperture, said first bridge member having a first set of ports formed therein to provide fluid communication from said first aperture to said first flow field between said first margin and said first raised surface;
  a second bridge member separate and distinct from said plate and said first bridge member, said second bridge member in sealing contact with said first margin on said second surface and surrounding said second aperture to provide a second raised surface around said second aperture, said second bridge member having a second set of ports formed therein to provide fluid communication from said second aperture to said second flow field between said first margin and said second raised surface;

a third bridge member distinct and separate from said plate and said first and second bridge members, said third bridge member in sealing contact with said second margin on said first surface and surrounding said third aperture to provide a third raised surface around said third aperture, said third bridge member having a third set of ports formed therein to provide fluid communication from said first flow field to said third aperture between said second margin and said third raised surface; and a fourth bridge member separate and distinct from said plate and said first, second, and third bridge members, said fourth bridge member in sealing contact with said second margin on said second surface and surrounding said fourth aperture to provide a fourth raised surface around said fourth aperture, said fourth bridge member having a fourth set of ports formed therein to provide fluid communication from said second flow field to said fourth aperture between said second margin and said fourth raised surface.

24. The separator plate assembly of claim 23 wherein each of said first and second bridge members comprise a peripheral wall extending between said first margin and said raised surface, said set of ports being formed in said peripheral wall.

25. The separator date assembly of claim 24 wherein each of said first and second bridge members further comprises a sealing surface extending from said peripheral wall and in sealing contact with said first margin on said respective first and second surfaces of said plate.

26. The separator plate assembly of claim 24 wherein said first bridge member further comprises a convolution formed in said first raised surface between said peripheral wall to provide a locally depressed region in contact with said first margin, thereby providing support for said first bridge member while allowing fluid communication therebetween.

27. The separator plate assembly of claim 23 wherein each of said third and fourth bridge members comprise a peripheral wall extending between said second margin and said raised surface, said set of ports being formed in said peripheral wall.

28. The separator plate assembly of claim 27 wherein each of said third and fourth bridge members further comprises a sealing surface extending from said peripheral wall and in sealing contact with said second margin on said respective first and second surfaces of said plate.

29. The separator plate assembly of claim 27 wherein said third bridge member further comprises a convolution formed in said third raised surface between said peripheral wall to provide a locally depressed region in contact with said second margin, thereby providing support for said third bridge member while allowing fluid communication therebetween.

30. The separator plate assembly of claim 23 wherein said plate comprises a first set of lands and channels formed in said first surface to define said first flow field and a second set of lands and channels formed in said second surface to define said second flow field.

31. The separator plate assembly of claim 30 wherein said plate comprises a thin, stamped plate such that said first set of lands in said first surface correspond to said second set of channels in said second surface, and said first set of channels in said first surface correspond to said second set of lands in said second surface.

32. The separator plate assembly of claim 31 wherein said first flow field provides a single-pass serpentine flow path between said first aperture and said third aperture, and said second flow field provides a single-pass serpentine flow path between said second aperture and said fourth aperture.

33. The separator plate assembly of claim 23 wherein said plate comprises a first set of lands and channels formed in said first surface to define said first flow field and a second set of lands and channels formed in said second surface to define said second flow field.

34. The separator plate assembly of claim 33 wherein said plate comprises a thin, stamped plate such that said first set of lands in said first surface correspond to said second set of channels in said second surface, and sat first set of channels in said first surface correspond to said second set of lands in said seclond surface.

35. The separator plate assembly of claim 1 wherein said first surface and said raised surface are both sealing surfaces.

36. The separator plate assembly of claim 1 wherein said peripheral wall is one or a plurality or peripheral walls and said set of ports is a first set of ports formed in a first one of said peripheral walls, and further comprising a second set of ports formed in a second one of said peripheral walls and in fluid communication with said first set of ports.

37. The separator plate assembly of claim 1 wherein an entire periphery of each of said ports is formed by said portion of said first surface, said portion of said raised surface, and said peripheral wall.

* * * * *